Patented June 25, 1935

2,005,944

UNITED STATES PATENT OFFICE 2,005,944

STABILIZED FORM OF PHOSPHORUS PENTOXIDE

Boris Malishev, Berkeley, Calif., assignor to Shell Development Company, San Francisco, Calif., a corporation of Delaware No Drawing. Application March 14, 1932, Serial No. 598,887

5 Claims. (Cl. 23—243)

This invention relates to a phosphorus pentoxide composition wherein the hygroscopicity of the phosphorus pentoxide is materially modified.

Phosphorus pentoxide is a loose powder which being extremely hydroscopic is difficult to store except in hermetically sealed containers. If exposed to humid air it is quickly changed by absorption of water to gelatinous meta-phosphoric acid thereby losing the specific properties which it possessed as anhydride. For example, where it is desired to utilize the refining action of phosphorus pentoxide such conversion to the hydrated form of phosphorus pentoxide is not tolerable as the hydrates do not possess the refining action that is characteristic of the anhydride. Accordingly, protection of the phosphorus pentoxide against moisture is a necessity. Further, the hygroscopicity of phosphorus pentoxide is a very objectionable factor for storage, transportation and handling.

To overcome these difficulties, it is proposed to incorporate the phosphorus pentoxide with a binder which is less hygroscopic than the phosphorus pentoxide and inert with respect to the anhydride under normal conditions.

I have found that phosphorus pentoxide can be utilized as a mixture with heavy oils, such as heavy fuel oils, pitches, (mineral or vegetable) such as wood tar pitch, petroleum pitch, coal tar pitch, Burgundy pitch and the like; tars, asphalts (natural or blown), bitumen, oxygenated mineral oils, waxes (natural or paraffinic) including beeswax, tallow, ozokerite, ceresine and the like; resins, gums, gum-resins, oleo-resins, fats, mineral oil residues, etc., or mixtures of the same. The physical method of incorporation is not an essential factor of this invention as the more or less intimate mixture may be obtained by various methods depending upon the character and quantity of the binder as well as on the subsequent employment of the finished product.

After the phosphorus pentoxide has been incorporated with the binder the mixture may be pressed into any desirable form such as bricks, briquettes and the like, which lend themselves to ease in handling, transportation and storage.

The manufactured article may be utilized as a refining agent in which case certain of the above enumerated binders may supplement and/or enhance its refining action. In my copending case, Serial No. 505,200 filed December 27, 1930, now Patent No. 1,914,953, June 20, 1933, I have described the use of the condensing and dehydrating properties of phosphorus pentoxide in conjunction with binders in the refining of mineral oils.

Secondary agents such as mechanical disintegrators, solvents, and chemical agents may be incorporated with the stabilized phosphorus pentoxide as set out in my above-mentioned copending application. These agents may comprise sand, certain organic oxy-compounds such as aldehydes, ketones and salts of organic acids comprising such compounds as benzophenone, copper oleate, copper acetate, copper naphthenate and metallic halides such as $FeCl_3$, $CuCl_2$, $SbCl_3$, etc. By way of example only, the hygroscopicity of phosphorus pentoxide in one of the above forms was tested. A mixture consisting of 30% phosphorus pentoxide and 70% asphalt was made. 20 grams each of the phosphorus pentoxide-asphalt mixture and phosphorus pentoxide were placed in an open dish and exposed to the air. After 95 hours of exposure, the phosphorus pentoxide-asphalt mixture still retained its loose powdered form, whereas the phosphorus pentoxide was completely transformed into a liquid.

The manufactured article may be conveniently employed in certain dehydrating, condensing, and other catalytic processes with substantial effect wherein it is desired to preserve the original character of the $P_2O_5$ prior to treatment.

It is to be understood that various modifications of procedure and substitutions of materials may be made within the scope of the invention but that such modifications and substitutions are to be considered as comprehended by the above disclosure and included within the terms of the following claims.

I claim as my invention:

1. Stabilized phosphorus pentoxide comprising: Phosphorus pentoxide incorporated with a relatively inert binder of the class consisting of fats, waxes, resins, gums, tars, pitches, asphalts and heavy oils.

2. Stabilized phosphorus pentoxide comprising: Phosphorus pentoxide incorporated with a relatively inert binder of asphaltic material whose hygroscopicity is less than that of the phosphorous pentoxide.

3. Stabilized phosphorus pentoxide comprising: Phosphorus pentoxide incorporated with a substantial proportion of pitch.

4. Stabilized phosphorus pentoxide comprising: Phosphorus pentoxide incorporated with a substantial proportion of asphalt.

5. Stabilized phosphorus pentoxide comprising: Phosphorus pentoxide incorporated with a substantial proportion of heavy oil.

BORIS MALISHEV.